(12) United States Patent
Kwon

(10) Patent No.: US 10,678,729 B1
(45) Date of Patent: Jun. 9, 2020

(54) INTERFACE CONVERSION DEVICE OF PROGRAMMABLE LOGIC CONTROLLER (PLC) SYSTEM AND PLC SYSTEM THEREOF

(71) Applicant: LSIS CO., LTD., Anyang-si, Gyeonggi-do (KR)

(72) Inventor: Jae Il Kwon, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/573,219

(22) Filed: Sep. 17, 2019

(30) Foreign Application Priority Data

Mar. 12, 2019 (KR) .......................... 10-2019-0028048

(51) Int. Cl.
*G06F 3/00* (2006.01)
*G06F 13/40* (2006.01)
*G05B 19/05* (2006.01)
*G06F 13/42* (2006.01)

(52) U.S. Cl.
CPC ....... *G06F 13/4009* (2013.01); *G05B 19/054* (2013.01); *G06F 13/4204* (2013.01); *G06F 13/4282* (2013.01); *G05B 2219/14131* (2013.01); *G05B 2219/15097* (2013.01)

(58) Field of Classification Search
None
See application file for complete search history.

(56) References Cited

U.S. PATENT DOCUMENTS

| 5,278,848 A | * | 1/1994 | Yamaguchi | ........... | H04L 12/423 |
| | | | | | 370/258 |
| 2007/0055388 A1 | * | 3/2007 | Araki | ................... | G05B 19/052 |
| | | | | | 700/18 |

* cited by examiner

*Primary Examiner* — Henry Tsai
*Assistant Examiner* — Dean Phan
(74) *Attorney, Agent, or Firm* — K&L Gates LLP

(57) ABSTRACT

The present disclosure relates to an interface conversion device of a programmable logic controller (PLC) system and a PLC system thereof. The interface conversion device of a PLC system according to an embodiment of the present disclosure is an interface conversion device that is applied to a PLC system including a base unit that controls an operation of the PLC system, a plurality of expansion modules that operate under the control of the base unit, and an interface that is a communication line between the base unit and each of the expansion modules, and is configured to connect between a first interface for parallel communication and a second interface for serial communication.

11 Claims, 5 Drawing Sheets

INTERFACE CONVERSION DEVICE OF PROGRAMMABLE LOGIC CONTROLLER (PLC) SYSTEM AND PLC SYSTEM THEREOF

CROSS-REFERENCE TO RELATED APPLICATION

Pursuant to 35 U.S.C. § 119(a), this application claims the benefit of earlier filing date and right of priority to Korean Patent Application No. 10-2019-0028048, filed on Mar. 12, 2019, the disclosure of which is incorporated herein by reference in its entirety.

BACKGROUND

1. Field of the Invention

The present disclosure relates to an interface conversion device of a programmable logic controller (PLC) system and a PLC system thereof, and more particularly, to a conversion device that enables a parallel interface and a serial interface to be simultaneously applied between a base unit and expansion modules of a PLC system, and a PLC system thereof.

2. Discussion of Related Art

FIG. 1 illustrates a configuration of a conventional programmable logic controller (PLC) system.

A PLC system is widely used for sequence control of the operation of various loads including electric motors. As shown in FIG. 1, such a PLC system may include a power supply module 1 that supplies power to each component, one base unit 2 that includes a central processing unit (CPU), a plurality of expansion modules 3, and an interface 4 that connects between the base unit 2 and each of the expansion modules 3. Here, the base unit 2 may control the operation of each of the expansion modules 3 while communicating through the interface 4.

FIG. 2 illustrates a configuration of the conventional PLC system that is provided with a parallel communication interface 4A.

Referring to FIG. 2, the parallel communication interface 4A, which uses a parallel communication method and may also be referred to as a "bus parallel interface," may be applied to the conventional PLC system.

That is, in the case of the parallel communication method, each interface 4A may include a chip select line (CSL) through which a selection signal (CS) for each of the expansion modules 3 is transmitted, a bus (BUS) through which communication data (BD) that is actual data to be transmitted is transmitted, a read line (RDL) through which a timing signal (RD) at a read (Read) operation is transmitted, and a write line (WRL) through which a timing signal (WR) at a write (Write) operation is transmitted. Here, the CSL may be implemented as an independent line (i.e., a dedicated line) for each of the expansion modules 3, while the BUS, the RDL, and the WRL may be implemented to be commonly used by the base unit 2 and each of the expansion modules 3.

That is, a CS1 signal may be transmitted only to the base unit 2 and an expansion module 1 through a CSL1. On the other hand, the BD signal, and the RD or WR signal may be transmitted to both the base unit 2 and each of the expansion modules 3 through a shared line of the BUS, the RDL, and the WRL.

FIG. 3 illustrates a configuration of the conventional PLC system that is provided with a serial communication interface 4B.

Referring to FIG. 3, the serial communication interface 4B, which uses a serial communication method and may also be referred to as a "universal asynchronous receiver/transmitter (UART) serial interface", may be applied to the conventional PLC system.

That is, in the case of the serial communication method, each interface 4B may include a transmission line (TXL) through which transmission data (TX) on the basis of the base unit 2 is transmitted and a reception line (RXL) through which reception data (RX) on the basis of the base unit 2 is transmitted. Here, the TXL or the RXL may be implemented to be commonly used by the base unit 2 and each of the expansion modules 3.

Meanwhile, in the conventional PLC system, only one of the parallel communication interface 4A and the serial communication interface 4B may be applied. That is, in the conventional PLC system, the base unit 2 and each of the expansion modules 3 operate only with the interface 4A or 4B that supports the previously promised communication method, which is the serial communication method or the parallel communication method, so that only the expansion module 3 for the interface of the corresponding communication method may be mounted, but the expansion module 3 for the interface of the other communication method may not be used.

Accordingly, the conventional PLC system may not adopt the expansion modules 3 of various communication methods due to the limitation of the interface of the available communication method and thus the system expandability is low. As a result, when attempting to replace the expansion module 3, there was inconvenience that the expansion module 3 should only be replaced with an expansion module 3 of the model that supports the interface of the corresponding communication method.

SUMMARY

The present disclosure is directed to providing a conversion device of a programmable logic controller (PLC) system and a PLC system thereof, which enables a parallel interface and a serial interface to be simultaneously applied between a base unit and an expansion module in the PLC system.

However, objectives to be achieved by embodiments of the present disclosure are not limited to the above-described objective, and other objectives, which are not described above, may be clearly understood by those skilled in the art through the following specification.

According to an aspect of the present disclosure, there is provided an interface conversion device of a PLC system, which is an interface conversion device applied to a PLC system including a base unit that controls an operation of a PLC, a plurality of expansion modules that operate under the control of the base unit, and an interface that is a communication line between the base unit and each of the expansion modules and is configured to connect between a first interface for parallel communication and a second interface for serial communication.

The interface conversion device of a PLC system may connect one chip select line (CSL1) of a plurality of chip select lines (CSL) of the first interface to a transmission line (TXL) of the second interface, and another chip select line (CSL2) to a reception line (RXL) of the second interface.

The interface conversion device of a PLC system may include a device information recognizer that is connected to a shared line of the first interface, the CSL1, and the CSL2 and communicates with the base unit to transmit data for the interface conversion device to the base unit and a signal switching logic that is connected to the CSL1, the CSL2, the TXL, and the RXL to relay communication between the base unit, which is connected to the first interface, and the expansion modules that are connected to the second interface.

The device information recognizer may communicate in a parallel communication manner, and the signal switching logic may relay communication in a serial communication manner.

The device information recognizer and the signal switching logic may play their roles according to the type of received data, and the device information recognizer may communicate at the time of address assignment for each of the expansion modules, which is performed in the base unit, and the signal switching logic may relay communication at or after the time of address assignment.

According to an aspect of the present disclosure, there is provided a PLC system including a base unit that controls an operation of a PLC, a plurality of expansion modules that operate under the control of the base unit, an interface that is a communication line between the base unit and each of the expansion modules, and a conversion device that connects between a first interface for parallel communication and a second interface for serial communication.

The conversion device may connect one chip select line (CSL1) of a plurality of chip select lines (CSL) of the first interface to a transmission line (TXL) of the second interface and another chip select line (CSL2) to a reception line (RXL) of the second interface.

The conversion device may include a device information recognizer that is connected to a shared line of the first interface, the CSL1, and the CSL2 and communicates with the base unit to transmit data for the interface conversion device to the base unit and a signal switching logic that is connected to the CSL1, the CSL2, the TXL, and the RXL to relay communication between the base unit, which is connected to the first interface, and the expansion modules that are connected to the second interface.

The device information recognizer may communicate in a parallel communication manner, and the signal switching logic may relay communication in a serial communication manner.

The device information recognizer and the signal switching logic may play their own roles according to the type of received data, and the device information recognizer may communicate at the time of address assignment for each of the expansion modules, which performed in the base unit, and the signal switching logic may relay communication at or after the time of address assignment.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
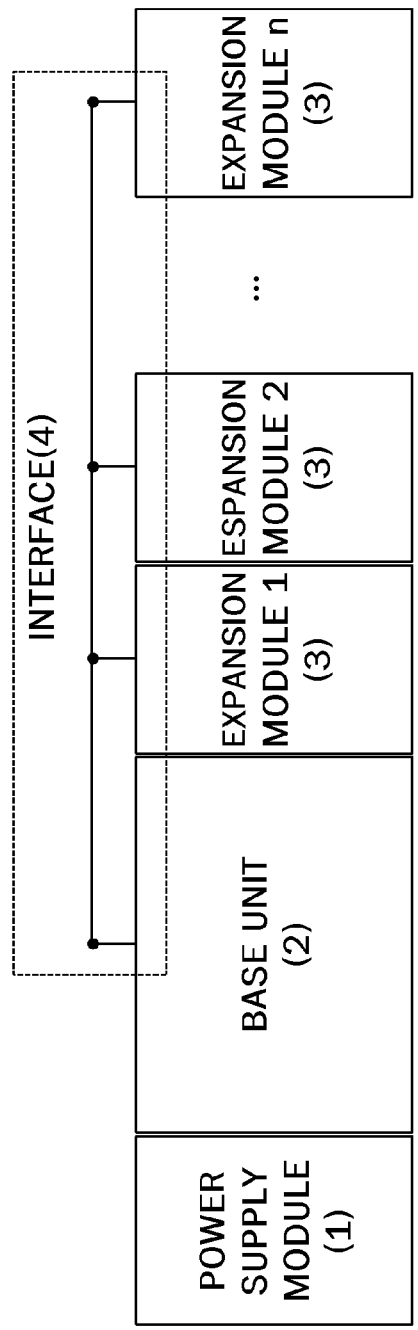
FIG. 1 illustrates a configuration of a conventional programmable logic controller (PLC) system.
Figure 2:
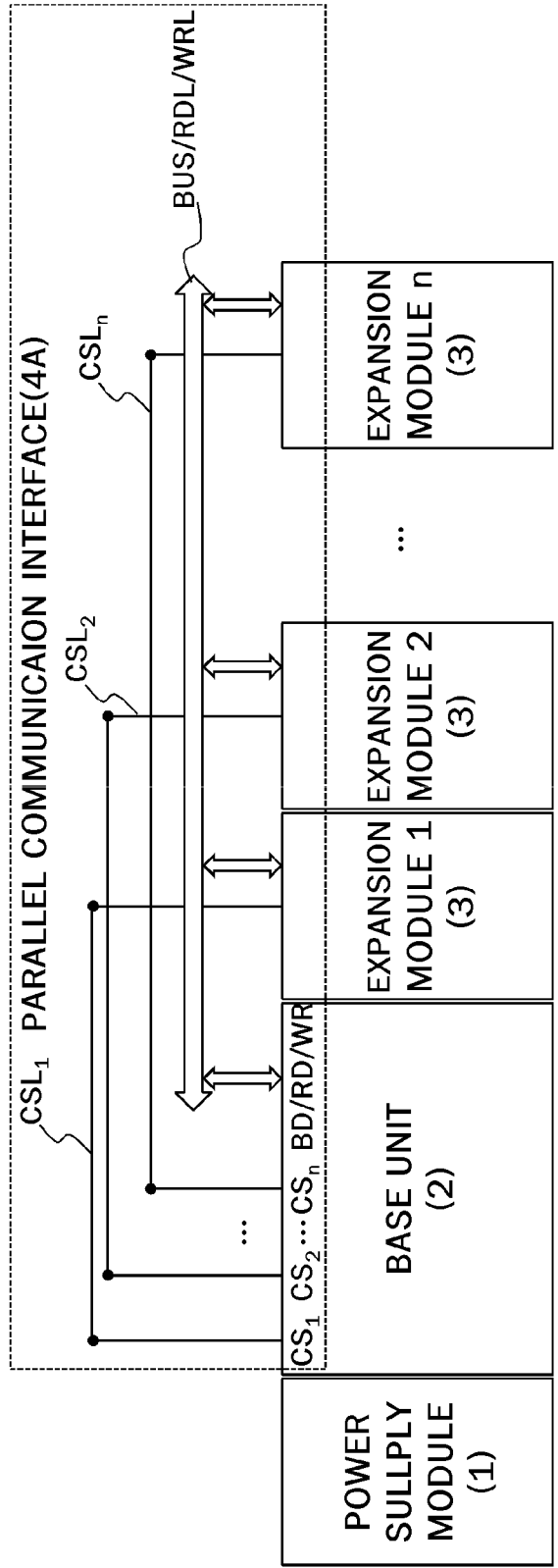
FIG. 2 illustrates a configuration of the conventional PLC system that is provided with a parallel communication interface (4A)
Figure 3:
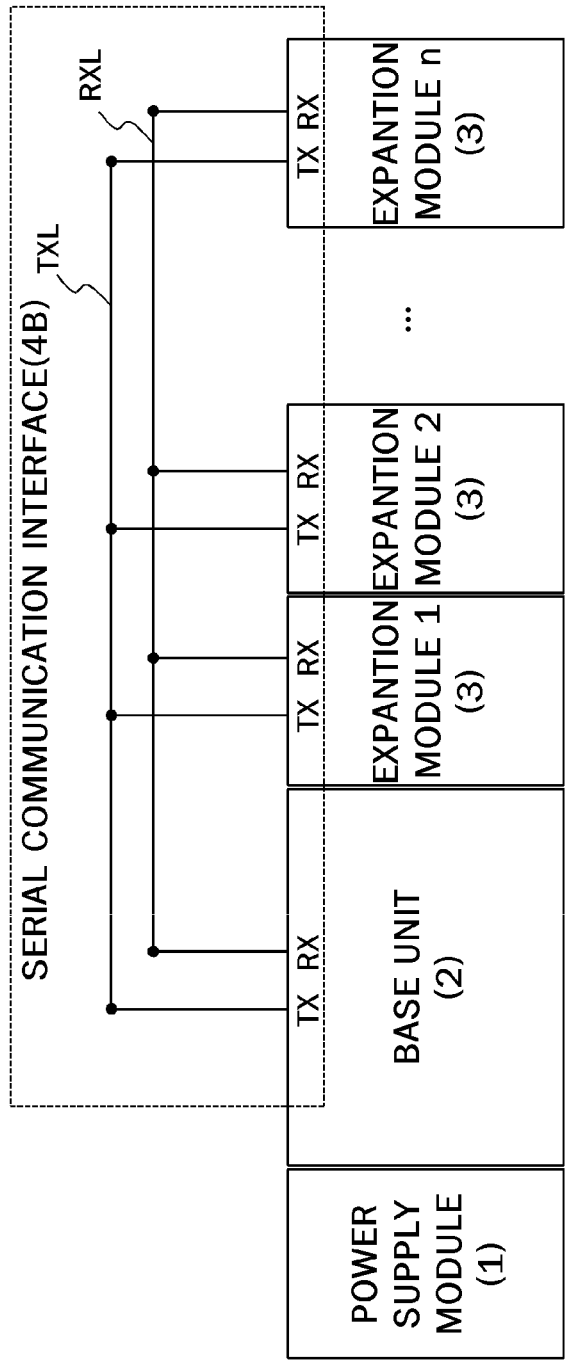
FIG. 3 illustrates a configuration of the conventional PLC system that is provided with a serial communication interface (4B)

The above-described objects and means of the present disclosure and the effects associated therewith will become more apparent through the following detailed description in conjunction with the accompanying drawings. Accordingly, those skilled in the art to which the present disclosure pertains can readily implement the technical spirit of the present disclosure. In addition, when it is determined that detailed descriptions of related well-known functions unnecessarily obscure the gist of the present disclosure during the description of the present disclosure, the detailed descriptions will be omitted.

Terms used herein are for the purpose of describing embodiments only and are not intended to limit the present disclosure. In the present specification, the singular forms "a," "an," and "the" are intended to include the plural forms as well in some cases, unless the context clearly indicates otherwise. In the present specification, terms such as "comprises," "comprising," "includes," "including," "has," and/or "having," do not preclude the presence or addition of one or more other components other than the components mentioned.

In the present specification, terms such as "or," "at least one," and the like may represent one of the words listed together, or may represent a combination of two or more. For example, "A or B" and "at least one of A and B" may include only one of A or B and may include both A and B.

In the present specification, descriptions following "for example" may not exactly match the information presented, such as cited characteristics, variables, or values, and embodiments of the disclosure according to various embodiments of the present disclosure should not be limited by effects such as modifications including limits of tolerances, measurement errors, and measurement accuracy, and other commonly known factors.

In the present specification, when it is described that one component is "connected" or "joined" to another component, it should be understood that the one component may be directly connected or joined to another component, but additional components may be present therebetween. However, when one component is described as being "directly connected," or "directly coupled" to another component, it should be understood that additional components may be absent between the one component and another component.

In the present specification, when one component is described as being "on" or "facing" another component, it should be understood that the one component may be directly in contact with or connected to another component, but additional components may be present between the one component and another component. Contrarily, when one component is described as being "directly on" or "in direct contact with" another component, it should be understood that there is no additional component between the one component and another component. Other expressions describing the relationship between components, such as "between ~," "directly between ~," and the like should be interpreted in the same way In the present specification, terms such as "first" and "second" may be used to describe various components, but the components should not be limited by the above terms. In addition, the above terms should not be interpreted as limiting the order of each component but may be used for the purpose of distinguishing one component from another. For example, a "first element" could be termed a "second element," and similarly, a "second element" could also be termed a "first element".

Unless defined otherwise, all terms used herein may be used in a sense commonly understood by those skilled in the art to which the present disclosure pertains. In addition, it should be understood that terms, such as those defined in commonly used dictionaries, will not be interpreted in an idealized or overly formal sense unless expressly so defined herein.

Hereinafter, an exemplary embodiment of the present disclosure will be described in detail with reference to the attached drawings.

Figure 4:
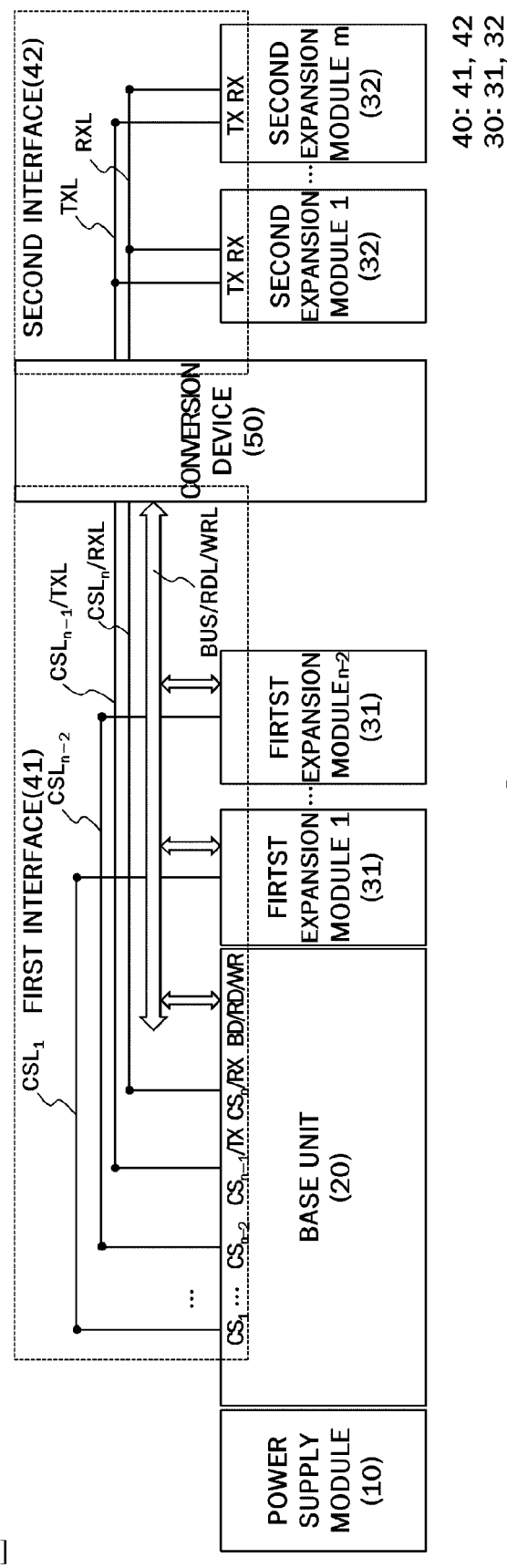
FIG. 4 illustrates a configuration of a PLC system according to an embodiment of the present disclosure.

FIG. 4 illustrates a configuration of a programmable logic controller (PLC) system according to an embodiment of the present disclosure.

The PLC system according to the embodiment of the present disclosure is a system that performs sequence control on the operation of various loads and, as shown in FIG. 4, includes a power supply module 10, a base unit 20, expansion modules 30, an interface 40, and a conversion device 50. That is, the PLC system may sequentially process input signals, which are input from the outside, by a program and control the operation of various loads connected thereto using processed output results. For example, the PLC system may be used as a control system for automatic control and monitoring of industrial plants.

The power supply module 10 supplies power required for the entire PLC system. That is, the power supply module 10 receives external power and converts the power (for example, alternating current (AC) 110 V/220 V, direct current (DC) 24 V, or the like.) into power suitable for the PLC system. For example, the power supply module 10 may supply power to each component of the PLC system, that is, the base unit 20, the expansion modules 30, the interface 40, and the conversion device 50.

The base unit 20 includes a central processing unit (CPU) and controls the overall operation of the PLC system by performing arithmetic processing necessary for controlling the PLC system. In particular, the base unit 20 recognizes, controls, and monitors each of the expansion modules 30 and the conversion device 50, which are connected to the interface 40, through the interface 40 and performs data transmission and reception with them.

In addition, the base unit 20 may perform an initialization operation when the PLC system or each component of the PLC system is turned on or reset. For example, the initialization operation may include an operation of diagnosing, data clearing, address assigning, or the like for each component of the PLC system. Here, the diagnosing operation may be an operation of identifying the expansion module 30 that is connected to the interface 40. In addition, the data clearing may be an operation of deleting unnecessary data that is stored in a memory. However, the address assigning operation will be described below.

The expansion module 30 performs a predetermined operation (input/output operation, communication operation, or the like) under the control of the base unit 20. For example, the expansion module 30 may be implemented as various modules such as an input module that receives input from an external device such as a sensor or a switch, an output module that transmits output to an external device such as a lamp, a solenoid, or a switch, and a communication module for data transmission and reception with other devices/apparatuses/systems. In particular, the expansion modules 30 may be divided into a first expansion module 31 and a second expansion module 32 according to the type of the interface 40 to be applied. Here, n-2 first expansion modules 31 (where n is a natural number of 3 or more) and m second expansion modules 32 (where m is a natural number equal to or different from n) may be provided.

The interface 40 is a communication line that is a component that connects between the base unit 20 and each of the expansion modules 30 and transmits data thereto and receives data therefrom such that the base unit 20 may recognize and control each of the expansion modules 30 or the conversion device 50. That is, the base unit 20 may control the operation of each of the expansion modules 30 while communicating with each of the expansion modules 30 through the interface 4. In particular, the interface 40 may include a first interface 41 that uses a parallel communication method and a second interface 42 that uses a serial communication method.

The first interface 41 is a transmission line through which data is transmitted using a parallel method. That is, the first interface 41 may be connected to the base unit 20, the plurality of first expansion modules 31, and the conversion device 50, and may also be referred to as a "bus parallel interface." The first interface 41 may include a chip select line (CSL), a bus (BUS), a read line (RDL), and a write line (WRL).

The CSL is a line through which a chip select signal (CS) is transmitted and is implemented as an independent line for each of the expansion modules 30 or the conversion device 50. Here, the CS is a signal indicating whether one first expansion module 31 or the conversion device 50 is selected. Accordingly, there may be n CSLs from $CSL_1$ to $CSL_n$, through each of which each CS is transmitted.

That is, $CS_1$ may be transmitted to the base unit 20 and a first expansion module 1 through $CSL_1$, and $CS_{n-2}$ may be transmitted to the base unit 20 and a first expansion module n-2 through $CSL_{n-2}$. However, $CS_{n-1}$ and $CS_n$ may be transmitted to the base unit 20 and the conversion device 50 through $CSL_{n-1}$ and $CSL_n$, respectively. Here, the $CSL_{n-1}$ and the $CSL_n$ may be used as a transmission line (TXL) and a reception line (RXL), respectively, as well as for transmitting CS, and this will be described in detail below.

The BUS is a line through which actual data, that is, communication data (BD) to be transmitted, is transmitted. The RDL is a line through which a timing signal (RD) at a read (Read) operation is transmitted. The WRL is a line through which a timing signal (WR) at a write (Write) operation is transmitted. The BD may have a parallel binary signal form in which binary signals such as eight bits or 16 bits are simultaneously transmitted, and the CS, the RD, and the WR may have the form of a signal indicating whether it is turned on/off.

However, unlike the CSL, the BUS, the RDL, and the WRL may be implemented to be commonly used (hereinafter, referred to as a "shared line") by the base unit 20, the first expansion module 31, and the conversion device 50. That is, the BD, the RD, and the WR may be transmitted to all of the base unit 20, the first expansion modules 31, and the conversion device 50 through the shared line of the BUS, the RDL, and the WRL.

That is, the base unit 20 may recognize, control, and monitor the first expansion modules 31 and the conversion device 50, and transmit and receive data therewith using signals of $CS_1$ to $CS_{n-2}$ through the $CSL_1$ to the $CSL_{n-2}$ that are dedicated lines of the first interface 41 and signals of BD/RD/WR through a shared line BUS/RDL/WRL the first interface 41

The second interface 42 is a transmission line through which data is transmitted using a serial communication method. That is, the second interface 42 may be connected to the conversion device 50 and the plurality of second expansion modules 32 and may also be referred to as a "universal asynchronous receiver/transmitter (UART) serial interface". For example, RS-232C, RS-485, or the like may be applied to the second interface 42. Specifically, the second interface 42 may include the TXL and the RXL.

The TXL is a line through which transmission data (TX) on the basis of the base unit 20, that is, data transmitted from the base unit 20, is transmitted. The RXL is a line through which reception data (RX) on the basis of the base unit 20, that is, data to be received by the base unit 20, is transmitted. Here, the TX and the RX may have a serial binary signal form in which binary signals such as eight bits or 16 bits are sequentially transmitted one bit at a time. In particular, the TXL or the RXL is a shared line and may be commonly used between the base unit 20 and the conversion device 50 or between the second expansion modules 32 and the conversion device 50. However, between the base unit 20 and the conversion device 50, one of the $CSL_{n-1}$ and the $CSL_n$ may be used as the TXL or the RXL.

The conversion device 50 is a module that connects between the first interface 41 and the second interface 42. Here, the conversion device 50 may connect one of the $CSL_{n-1}$ and the $CSL_n$, which may be used as the TXL or the RXL in the first interface 41, to the TXL of the second interface 42 and connect the other one of the $CSL_{n-1}$ and the $CSL_n$ to the RXL of the second interface 42.

That is, the base unit 20 may recognize, control and monitor second expansion modules 31, and transmit and receive data therewith using signals of TX and RX through the $CSL_{n-1}$ and the $CSL_n$, which are dedicated lines of the first interface 41, and the TXL and the RXL of the second interface 42.

Figure 5:
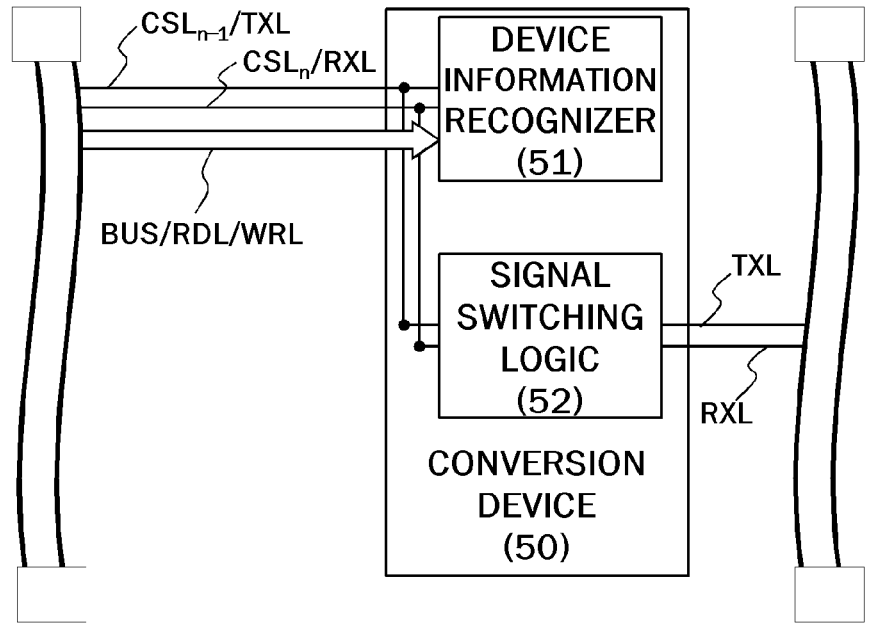
FIG. 5 illustrates a more detailed configuration of a conversion device (50) and a configuration of each interface connected thereto.

FIG. 5 illustrates a more detailed configuration of the conversion device 50 and a configuration of each interface connected thereto.

Referring to FIG. 5, the conversion device 50 may include a device information recognizer 51 and a signal switching logic 52.

The front end of the device information recognizer 51 is connected to each of the shared line BUS/RDL/WRL, the $CSL_{n-1}$, and the $CSL_n$ of the first interface 41. Accordingly, the device information recognizer 51 may transmit and receive various types of information with the base unit 20 through the shared line and the $CSL_{n-1}$ or the $CSL_n$. Here, the device information recognizer 51 may communicate with the base unit 20 by a parallel communication method.

The front end of the signal switching logic 52 is connected to the $CSL_{n-1}$ and the $CSL_n$ of the first interface 41, and the rear end thereof is connected to the TXL and the RXL of the second interface 42. Accordingly, the signal switching logic 52 may relay communication between the base unit 20, which is connected to the first interface 41, and the plurality of second expansion modules 32 that are connected to the second interface 42. Here, the signal switching logic 52 may relay between the base unit 20 and the second expansion module 32 in a serial communication manner.

Here, the device information recognizer 51 and the signal switching logic 52 may perform their own roles (operations) according to the data type of the information received from the first interface 41 or the second interface 42, that is, from the base unit 20 or each of the expansion modules 30.

Hereinafter, a data transmission process between the base unit 20, each of the expansion modules 30, and the conversion device 50, and an operation performed by the device information recognizer 51 and the signal switching logic 52 of the conversion device 50 will be described in more detail.

Figure 6:
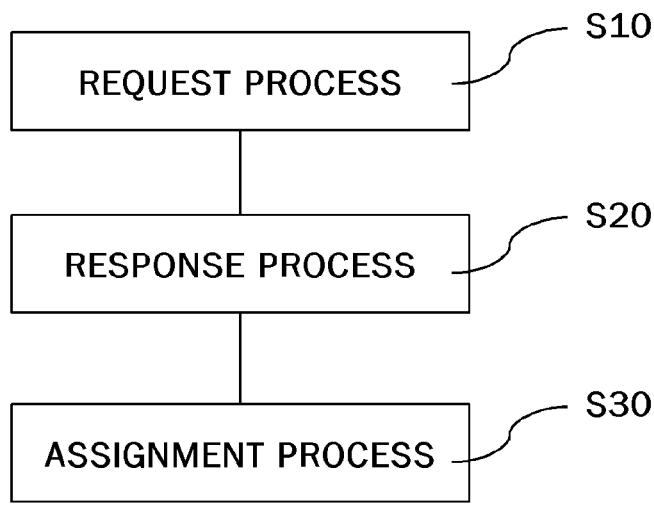
FIG. 6 illustrates a flowchart of an address assignment operation.

FIG. 6 illustrates a flowchart of an address assignment operation.

First, the address assignment operation will be described. In order for the expansion module 30 and the conversion device 50 to communicate with each other, information, such as identifying each of the expansion module 30 and the conversion device 50, needs to be allocated in a memory of the base unit 20, and this operation is referred to as the address assignment operation.

That is, referring to FIG. 6, when performing the initialization operation, the base unit 20 transmits query data for identifying each of the expansion modules 30 included in the PLC system to each of the expansion modules 30 through the interface 40 (S10). Here, the base unit 20 may sequentially transmit CS to the CSL that is implemented as a dedicated line, and at the same time, may transmit a specific signal corresponding to the query data to the shared line. For example, the base unit 20 may transmit $CS_1$ to the $CSL_1$ and simultaneously transmit BD of query data (QD) to the BUS, and RD to the RDL by a parallel communication method.

Thereafter, each of the expansion modules 30, which has received the query data, transmits response data, which includes the information identifying itself, to the base unit 20 through the interface 40 (S20). For example, the first expansion module 1, which has received $CS_1$, QD, and RD through the $CSL_1$, the BUS, and the RDL of the first interface 41, may transmit response data to the base unit 20. That is, the first expansion module 1 may transmit CS1 to the CSL1 and simultaneously transmit BD of the response data (AD) including identification data thereof to the BUS, and RD to the RDL by a parallel communication method.

As a result, the base unit 20 allocates an address for each of the expansion modules 30, which is provided in the PLC system, in the memory thereof using the received response data (S30). For example, the base unit 20 that has received the $CS_1$, the AD, and the RD may allocate the address for the first expansion module 1 to its memory using the AD that includes identification data of the first expansion module 1.

However, the above-described S10 to S30 are repeatedly performed for all the first expansion modules 31 connected to the $CSL_1$ to the $CSL_{n-2}$. For example, for a first expansion module 2, $CS_2$, query data (QD), and RD are transmitted and received by a parallel communication method (S10), and $CS_2$, response data (AD), and RD are transmitted and received by a parallel communication method (S20) so that the address allocation (S30) for the first expansion module 2 may be performed.

Further, the above-described S10 to S30 are also performed for the conversion device 50 that is connected to the $CSL_{n-1}$.

That is, the device information recognizer 51 of the conversion device 50 receives $CS_{n-1}$, and QD and RD that are transmitted by the base unit 20 by a parallel communication method through the $CSL_{n-1}$ and through the BUS and RDL of the first interface 41, respectively (S10). Thereafter, the device information recognizer 51 transmits $CS_{n-1}$, and QD, which is information about the conversion device 50, that is, information identifying the conversion device 50, and RD to the base unit 20 through the $CSL_{n-1}$, and the BUS and RDL of the first interface 41, respectively, by a parallel communication method (S20). As a result, the base unit 20 may determine that the conversion device 50 is connected to the $CSL_{n-1}$ and the $CSL_n$ using the received response data and may perform address allocation to the conversion device 50 (S30).

Thereafter, the above-described S10 to S30 are also performed for all the second expansion modules 32 that are connected to the second interface 42.

That is, after address assignment to the conversion device 50 is completed, the base unit 20 sets either one of the $CSL_{n-1}$ and the $CSL_n$ of the first interface 41 to be used as the TXL, and the other one to be used as the RXL (hereinafter, it will be described that the $CSL_{n-1}$ is set to the TXL, and the $CSL_n$ is set to the RXL). Thereafter, the base unit 20 transmits query data to the CSLn−1 of the first interface 41 by a serial communication method (S10). Thereafter, the signal switching logic 52 of the conversion device 50 recognizes that the received query data is to be relayed and relays and transmits the query data to the TXL of the second interface 42 by a serial communication method. As a result, the query data may be transmitted to each of the second expansion modules 32, which is the destination, through the TXL of the second interface 42.

Thereafter, each of the second expansion modules 32 transmits response data that includes its own identification data to the RXL of the second interface 42 by a serial communication method (S20). Thereafter, the signal switching logic 52 of the conversion device 50 recognizes that the received response data is to be relayed and relays and transmits the response data to the $CSL_n$ of the first interface 41 by a serial communication method. As a result, the response data is transmitted to the base unit 20, which is the destination, through the $CSL_n$ of the first interface 41, and the base unit 20 may perform address allocation for each of the second expansion modules 32 using the received response data (S30).

Next, a data transmission process performed after the address assignment operation will be described.

After the address assignment operation, the base unit 20 and each of the expansion modules 30 may transmit and receive data with each other. Here, the data may be transmitted and received between the base unit 20 and the first expansion module 31 using the CSL and the shared line of the first interface 41.

For example, the first expansion module 2 transmits $CS_2$ and BD that includes its own state data (CD) and WR to the base unit 20 through $CSL_2$ and the BUS and WRL of the first interface 41, respectively, by a parallel communication method. The base unit 20 that has received the $CS_2$, the BD, and the WR may store the CD in the memory thereof and operate the CPU to perform the control accordingly.

Further, data may be transmitted and received between the base unit 20 and the second expansion module 32 using the $CSL_{n-1}$ and the $CSL_n$ of the first interface 41 and the TXL and the RXL of the second interface 42.

For example, when the base unit 20 is to transmit data to a second expansion module 1, the base unit 20 sets the $CSL_{n-1}$ of the first interface 41 to be used as the TXL. Thereafter, the base unit 20 transmits specific data that includes identification data of the corresponding second expansion module 1 and the corresponding data to the $CSL_{n-1}$ of the first interface 41 by a serial communication method. Thereafter, the signal switching logic 52 of the conversion device 50 recognizes that the received specific data is to be relayed and relays and transmits the specific data to the TXL of the second interface 42 by a serial communication method. As a result, the specific data may be transmitted to the second expansion module 1, which is the destination, through the TXL of the second interface 42.

Further, when the second expansion module 1 is to transmit data to the base unit 20, the second expansion module 1 transmits specific data, which includes its own identification data and the corresponding data, to the RXL of the second interface 42 by a serial communication method. Thereafter, the signal switching logic 52 of the conversion device 50 recognizes that the received specific data is to be relayed and relays and transmits the specific data to the RXL of the first interface 41 by a serial communication method. As a result, the specific data may be transmitted to the base unit 20, which is the destination, through the RXL of the first interface 41, and the base unit 20, which has received the specific data, stores the specific data in the memory thereof and operates the CPU to perform the control accordingly.

According to the present disclosure configured as described above, both a parallel interface and a serial interface can be applied to a conventional PLC system, which includes the parallel interface and the serial interface, by further including a conversion device.

Accordingly, the present disclosure has the advantage of having high expandability in which various expansion modules can be applied.

In addition, according to the present disclosure, new interface type expansion modules can be added while maintaining the function/performance of the conventional system, thereby reducing installation costs.

In addition, the present disclosure has the advantage of simultaneously providing flexibility in system configuration and user convenience.

While specific embodiments have been described in the detailed description of the present disclosure, various modifications may be made without departing from the scope of the present disclosure. Therefore, the scope of the present disclosure is defined not by the described embodiment but by the appended claims and encompasses equivalents that fall within the scope of the appended claims.

What is claimed is:

1. An interface conversion device of a programmable logic controller (PLC) system comprising: a base unit that controls an operation of the PLC, a plurality of first expansion modules each communicating in parallel with the base unit, a plurality of second expansion modules each communicating in series with the base unit, a first interface including communication lines between the base unit and each of the first expansion modules, and a second interface including communication lines between the base unit and each of the second expansion modules, the interface conversion device comprising:
a switching unit configured to connect the first interface and the second interface,
wherein the first interface comprises:
a plurality of chip selecting lines (CSLs) through which a first signal passes between the base unit and each of the first expansion modules,
a common line through which a second signal passes between the base unit, the first expansion modules, and the conversion device in series,
a first line through which a third signal passes from the base unit to the switching unit, and
a second line through which a fourth signal passes from the switching unit to the base unit,
wherein the second interface comprises:

a common transmission line (TXL) through which the switching unit transmits a fifth signal to each of the second expansion modules, and a common receiving line (RXL) through which the switching unit receives a sixth signal from each of the second expansion modules, and wherein the switching unit is configured to connect the first line to the TXL in the second interface and the second line to the RXL in the second interface.

2. The interface conversion device of claim 1, wherein the interface conversion device includes:

a device information recognizer connected to the first line, the second line, and the common line, and configured to receive the third signal from the base unit through the first line and transmit the fourth signal to the base unit through the second line.

3. The interface conversion device of claim 1, wherein the device information recognizer communicates in parallel with the base unit, and the switching unit communicates in serial with the base unit and the second expansion modules.

4. The interface conversion device of claim 1, wherein the device information recognizer communicates with the base unit when the base unit assigns addresses to each of the first and second expansion modules.

5. A programmable logic controller (PLC) system, the system comprising:

a base unit configured to control an operation of the PLC;

a plurality of first expansion modules each communicating in parallel with the base unit;

a plurality of second expansion modules each communicating in series with the base unit;

a first interface including communication lines between the base unit and each of the first expansion modules;

a second interface including communication lines between the base unit and each of the second expansion modules; and a conversion device configured to connect the first interface and the second interface wherein the first interface comprises:

a plurality of chip selecting lines (CSLs) through which a first signal passes between the base unit and each of the first expansion modules, a common line through which a second signal passes between the base unit, the first expansion modules, and the conversion device in series, a first line through which a third signal passes from the base unit to the conversion device, and a second line through which a fourth signal passes from the conversion device to the base unit, wherein the second interface comprises:

a common transmission line (TXL) through which the conversion device transmits a fifth signal to each of the second expansion modules, and a common receiving line (RXL) through which the conversion device receives a sixth signal from each of the second expansion modules, and wherein the conversion device is configured to connect the first line to the TXL in the second interface and the second line to the RXL in the second interface.

6. The PLC system of claim 5, wherein the conversion device includes:

a device information recognizer connected to the first line, the second line, and the common line, and configured to receive the third signal from the base unit through the first line and transmit the fourth signal to the base unit through the second line; and a switching unit connected to the first line, the second line, the TXL, and the RXL, and configured to connect the first line to the TXL and the second line to the RXL.

7. The PLC system of claim 5, wherein the device information recognizer communicates in parallel with the base unit, and the switching unit communicates in serial with the base unit and the second expansion modules.

8. The PLC system of claim 5, wherein the device information recognizer communicates with the base unit when the base unit assigns addresses to each of the first and second expansion modules.

9. The system of claim 5, wherein the base unit transmits a first chip signal through the CSLs, respectively, and a signal corresponding to query data through the common line to each of the first expansion modules, and each of the first expansion modules transmits a second chip signal through the CSLs, respectively, and a signal corresponding to response data through the common line.

10. The system of claim 5, wherein the base unit transmits a first chip signal through the first line and a signal corresponding to query data through the common line to the conversion device, and the conversion device transmits a second chip signal through the first line and a signal corresponding to response data through the common line.

11. The system of claim 5, wherein the base unit transmits a first chip signal through the first line and the TXL and a signal corresponding to query data through the common line and the TXL to each of the second expansion modules, and each of the second expansion modules transmits a second chip signal through the RXL and the second line and a signal corresponding to response data through the RXL and the common line.

* * * * *